United States Patent
Rimaux et al.

(10) Patent No.: US 7,766,108 B2
(45) Date of Patent: Aug. 3, 2010

(54) METHOD FOR FAST STARTING OF A HYBRID VEHICLE

(75) Inventors: Stephane Rimaux, Meudon (FR); Paulo Miranda, Courbevoie (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 306 days.

(21) Appl. No.: 11/817,676

(22) PCT Filed: Feb. 24, 2006

(86) PCT No.: PCT/FR2006/050162
§ 371 (c)(1),
(2), (4) Date: Aug. 31, 2007

(87) PCT Pub. No.: WO2006/092522
PCT Pub. Date: Sep. 8, 2006

(65) Prior Publication Data
US 2008/0115986 A1 May 22, 2008

(30) Foreign Application Priority Data
Mar. 1, 2005 (FR) .................................. 05 50544

(51) Int. Cl.
*B60W 10/04* (2006.01)
(52) U.S. Cl. .............................. 180/65.265; 180/65.28; 180/65.285; 903/946
(58) Field of Classification Search .............. 180/65.21, 180/65.265, 65.275, 65.28, 65.285; 903/946; 701/22; 123/179.1, 179.3
See application file for complete search history.

(56) References Cited

U.S. PATENT DOCUMENTS

| 6,083,139 A * | 7/2000 | Deguchi et al. ................. 477/5 |
| 6,175,785 B1 | 1/2001 | Fujisawa et al. |
| 6,253,127 B1 | 6/2001 | Itoyama et al. |
| 6,543,561 B1 * | 4/2003 | Pels et al. ................. 180/65.23 |
| 6,722,332 B2 * | 4/2004 | Kojima ..................... 123/179.3 |
| 7,079,939 B2 * | 7/2006 | Kataoka et al. ............. 701/112 |
| 2002/0050259 A1 | 5/2002 | Kojima et al. |

FOREIGN PATENT DOCUMENTS

| DE | 10204981 A1 | 8/2003 |
| EP | 0965475 A | 12/1999 |
| EP | 1201479 A | 5/2002 |

OTHER PUBLICATIONS

International Search Report mailed Aug. 3, 2006 in PCT/FR2006/050162.

* cited by examiner

*Primary Examiner*—S. Joseph Morano
*Assistant Examiner*—John D Walters
(74) *Attorney, Agent, or Firm*—Nicolas E. Seckel

(57) ABSTRACT

The invention essentially concerns a method for fast starting of a hybrid vehicle. Said method uses a power transmission device (1.1) comprising a traction chain consisting of a heat engine (2), a clutch (3), an electrical machine (4), and wheels (6). The invention is characterized in that said method, in order to rapidly accelerate the vehicle when it is stopped, consists in starting the heat engine (2) concurrently with the actuation of the electrical machine, using a starting system (7) mechanically independent of the electrical machine (4).

9 Claims, 4 Drawing Sheets

STATE OF THE ART

STATE OF THE ART

METHOD FOR FAST STARTING OF A HYBRID VEHICLE

Figure 1:
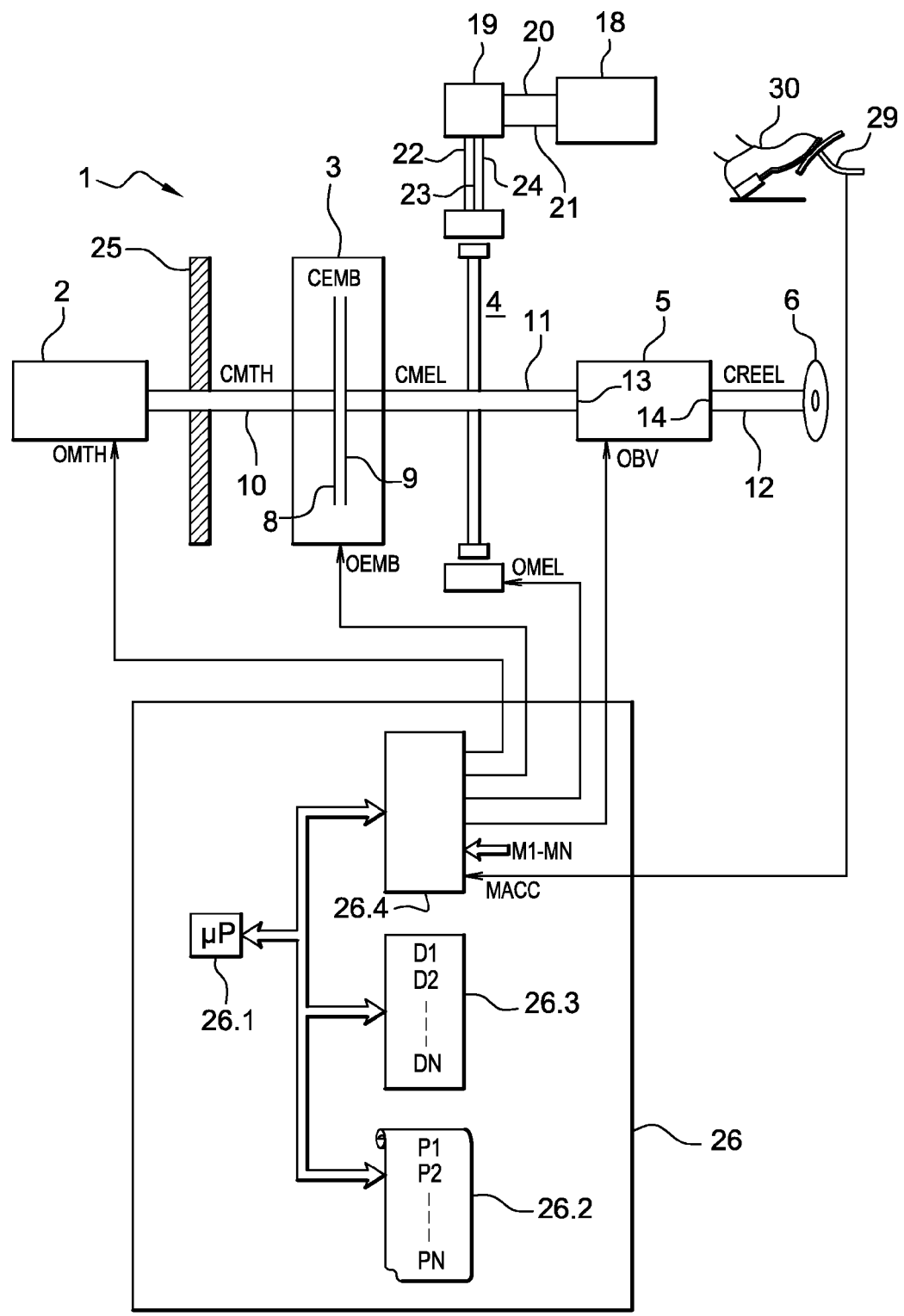

The present invention concerns a method for fast setting in motion of a hybrid vehicle. An objective of the invention is to optimize an acceleration of the vehicle when it is set in motion, while ensuring in particular a supply of torque applied to the wheels ensuring a high driving pleasure. A particularly advantageous application of the invention is in the field of motor vehicles, but it could also be implemented in any kind of hybrid propulsion land vehicle.

In the present text, the term "start" is used to designate the initiation of the rotation of the heat engine crankshaft. The term "setting in motion" is used to designate the initial movement of the vehicle from a zero speed to a non-zero speed. The term "powered on" is used for the electrical machine when it is turned on.

So-called hybrid vehicles are known that combine the use of heat energy and of electrical energy to power their drive. This combination of energies is done in such a way as to optimize the fuel efficiency of such vehicles. This optimization of the fuel efficiency makes it possible for the hybrid vehicles to pollute far less and use far less fuel than vehicles operating solely on heat energy and whose efficiency is not optimized.

Several types of hybrid vehicles power transmission devices have been more particularly developed.

Firstly, hybrid transmission devices are known that have an engine and two electrical machines. The wheel shaft, the shaft of the heat engine and the shafts of the two electrical machines are connected to one another through a mechanical assembly. This mechanical assembly can be made up of two planetary gearsets. Such a transmission device is described in the French application FR-A-2832357.

Hybrid transmission devices having a heat engine and a single electrical machine are also known. A shaft of this heat engine and a shaft of this electrical machine are connected to one another through a clutch. In addition, an input of a speed control unit, such as a gearbox or a speed controller, is connected to the shaft of the electrical machine. An output of this speed control unit is connected to a shaft of the wheels of the vehicle. Such a device is operable in two different modes. In a first mode, known as electrical mode, the electrical machine alone powers the drive of the vehicle. In a second mode, known as hybrid mode, the electrical machine and the heat engine together power the drive of the vehicle.

In the hybrid mode, the power supplied by the electrical machine makes it possible to adjust the torque applied to the wheel shaft while also adjusting the torque and the speed of the heat engine to an operating point at which fuel consumption is optimized.

Each member of the transmission device: heat engine, clutch, electrical machine, and speed control unit, is controlled by a local control device, which is in turn commanded by a specific computer called "supervising computer." This computer can be independent or integrated into another computer such as the engine computer, for example. This supervising computer executes programs to synchronize in particular the actions of the various elements of the transmission device with one another. This synchronization is carried out in such a way as to best fulfill a driver's request for acceleration.

More precisely, depending on the acceleration desired by the user and vehicle driving conditions, the supervising computer controls the various members of the device, selects the operating mode, coordinates the transitional phases of the various members, and chooses operating points for the engine and the electrical machine. The term "driving conditions" includes vehicle parameters as well as external parameters that can influence the operation of the vehicle. For example, the speed and acceleration of the vehicle are vehicle parameters, whereas the slope of a hill on which the vehicle is traveling and the ambient temperature are external parameters.

FIG. 1 shows a schematic representation of a transmission device 1 according to state of the art. This transmission device 1 has a heat engine 2, a clutch 3, an electrical machine 4, a speed control unit 5 such as a gearbox or a speed controller, and wheels 6, which make up a traction drive.

More precisely, the clutch 3 has a first clutch plate 8 and a second clutch plate 9. The first clutch plate 8 is connected to a shaft 10 of the heat engine 2. And the second clutch plate 9 is connected to a shaft 11 of the electrical machine 4. Additionally, the shaft 11 of the electrical machine 4 and a shaft 12 of the wheels 6 are respectively connected to an input 13 and an output 14 of the speed control unit 5.

As previously mentioned, the transmission device 1 is operable in two different modes. In electrical mode, the shaft 12 of the wheels 6 is driven by the electrical machine 4 alone. The clutch 3 is then released, so that the shaft 10 of the engine 2 and the shaft 11 of the electrical machine 4 are not coupled to one another. In this electrical mode, the electrical machine 4 generally operates as an engine. In a particular embodiment, then, the machine 4 draws energy from a storage system 18 such as a battery, notably through an inverter 19. The battery 18 delivers a DC voltage signal. In electrical mode, the inverter 19 thus transforms the DC voltage signal detectable between the battery terminals 20 and 21 into AC voltage signals, which are applied to phases 22-24 of the electrical machine 4.

In hybrid mode, the shaft 12 of the wheels 6 is driven by the heat engine 2 and the electrical machine 4. The clutch 3 is then engaged, so that the shaft 10 of the engine 2 and the shaft 12 of the wheels 6 are coupled to one another. The electrical machine 4 generally acts as an engine or as a generator and transmits power to the shaft 12 of the wheels 6 in order to adjust the torque detectable on the shaft 12 of the wheels 6 to the setpoint torque. In the same manner as that explained previously, the machine 4 transfers energy with the battery 18.

In electrical mode and hybrid mode, during battery recharge phases that coincide with a deceleration of the vehicle, the electrical machine 4 acts as a generator. During these recharge phases, the electrical machine 4 supplies energy to the battery 18. The inverter 19 then transforms the AC voltage signals detectable on phases 22-24 of the electrical machine 4 into a DC voltage signal that is applied to the terminals 20 and 21 of the battery 18.

In practice, the electrical machine 4 is a three-phase synchronous machine. An advantage of machines of this type is that they feature a compact design and good output.

In a particular embodiment, the transmission device 1 has a flywheel 25. This flywheel 25 participates in performing a function of filtering out cyclical variations in order to ensure a continuous transmission of torque from the heat engine 2 to the shaft 12 of the wheels 6.

In addition, the state of the art transmission device 1 has an independent control unit consisting of a supervising computer 26 in this case. This supervising computer 26 has a microprocessor 26.1, a program memory 26.2, a data memory 26.3, and an input-output interface 26.4, connected to one another via a communication bus 31.

The data memory 26.3 contains data D1-DN, which correspond to the characteristics of the various members of the transmission device 1, namely, the heat engine 2, the clutch 3, the electrical machine 4 and the speed control unit 5. Some of the data D1-DN, for example, correspond to the response times of these members 2-5. Other data D1-DN, for example, correspond to maximum and minimum torques that can be applied to shafts associated with the members 2-5.

The input-output interface 26.4 receives signals M1-MN detectable at sensor outputs (not shown). These sensors make it possible to detect the vehicle driving conditions. For example, acceleration and speed sensors make it possible to know the acceleration and the speed of the vehicle, respectively, at any given moment. A slope sensor can tell whether the vehicle is on a slope or not. In addition, the interface 26.4 receives a MACC signal corresponding to a torque on the wheel as requested by a driver. That is, when he wants to accelerate, the driver presses on a pedal 29 with his foot 30. The resulting MACC signal is a function of how far down this pedal 29 is pushed.

According to the data D1-DN, the driving conditions, and the acceleration requested by the driver, the microprocessor 26 executes one of the programs P1-PN that initiates the operation of the transmission device 1 in a particular mode, and the adjustment of the measurable torque on the shaft 12 of the wheels 6. More precisely, when one of the programs P1-PN is executed, the microprocessor 26 commands the interface 26.4 in such a way that OMTH, OEMB, OMEL and OBV signals are sent to the heat engine 2, the clutch 3, the electrical machine 4, and the speed control unit 5, respectively, in order to control them.

When there is a change in operating mode, some of the programs P1-PN generate OMTH, OEMB, OMEL and OBV signals that direct the transition from one mode to another.

In addition, the members 2-5 of the transmission device 1 each have an internal control system that is not shown. These control systems make it possible to regulate the measurable torque values on shafts associated with these members 2-5.

In one example, with the driver requesting a slight acceleration, the supervising computer 26 commands the various members 2-5 so as to make the transmission device 1 operate in electrical mode. The torque applied to the shaft 12 of the wheels 6 is then equal to the torque detectable on the shaft 11 of the electrical machine 4 adjusted by a gear ratio. In contrast, with a request for a strong acceleration, the supervising computer 26 commands the various members 2-5 so as to make the transmission device 1 operate in hybrid mode. The torque applied to the shaft 12 of the wheels 6 is then equal to the torque detectable on the shaft 11 of the electrical machine 4, which is then equal to the sum of the torques detectable on the shaft 10 of the heat engine 2 and on the shaft of the machine 4.

Situations are also known in the life of a vehicle in which a request for a fast acceleration is made by the driver, while the vehicle is stopped. Such acceleration requests are called "performance" or "perfo" initiations of movement. To obtain these performance initiations of movement, the supervising computer 26 commands in particular the clutch 3, the heat engine 2 and the electrical machine 4, so as to best exploit the powers of the heat engine 2 and of the electrical machine 4. In other words, the supervising computer 26 commands the members 2-5 so that a timing for setting the vehicle in motion be minimal and so that a level of acceleration be maximal.

To obtain a "performance" initiation of movement, a first known method is implemented with the device 1 of the state of the art. In a first step of the method, the heat engine 2 is started with the electrical machine 4, while the speed control unit 5 is in neutral. Then, in a second step, the clutch 3 disengages and the speed of the electrical machine 4 is zeroed out, then finally the first gear is set in order to utilize the heat engine 2 and the electrical machine 4 for powering the drive. The drawback of this first method is that no powering of the drive is possible as long as the heat engine 2 is not started. The response time of the transmission device 1 implementing this method is thus very long.

A second method is also known in which the drive of the vehicle is first powered in the electrical mode. Then, once the speed of the electrical machine 4 is sufficient, the heat engine 2 is started by friction of the clutch 3, and there is a shift to the hybrid mode. In this method, the clutch 3 transmits a breakaway torque to the heat engine 2. An objective of this breakaway torque is to drive this heat engine 2 in rotation and to start it. During the transmission of the breakaway torque, the electrical machine 4 applies a torque that compensates this breakaway torque, so that there is no variation in the torque applied to the shaft 12 of the wheels 6.

Figure 2:
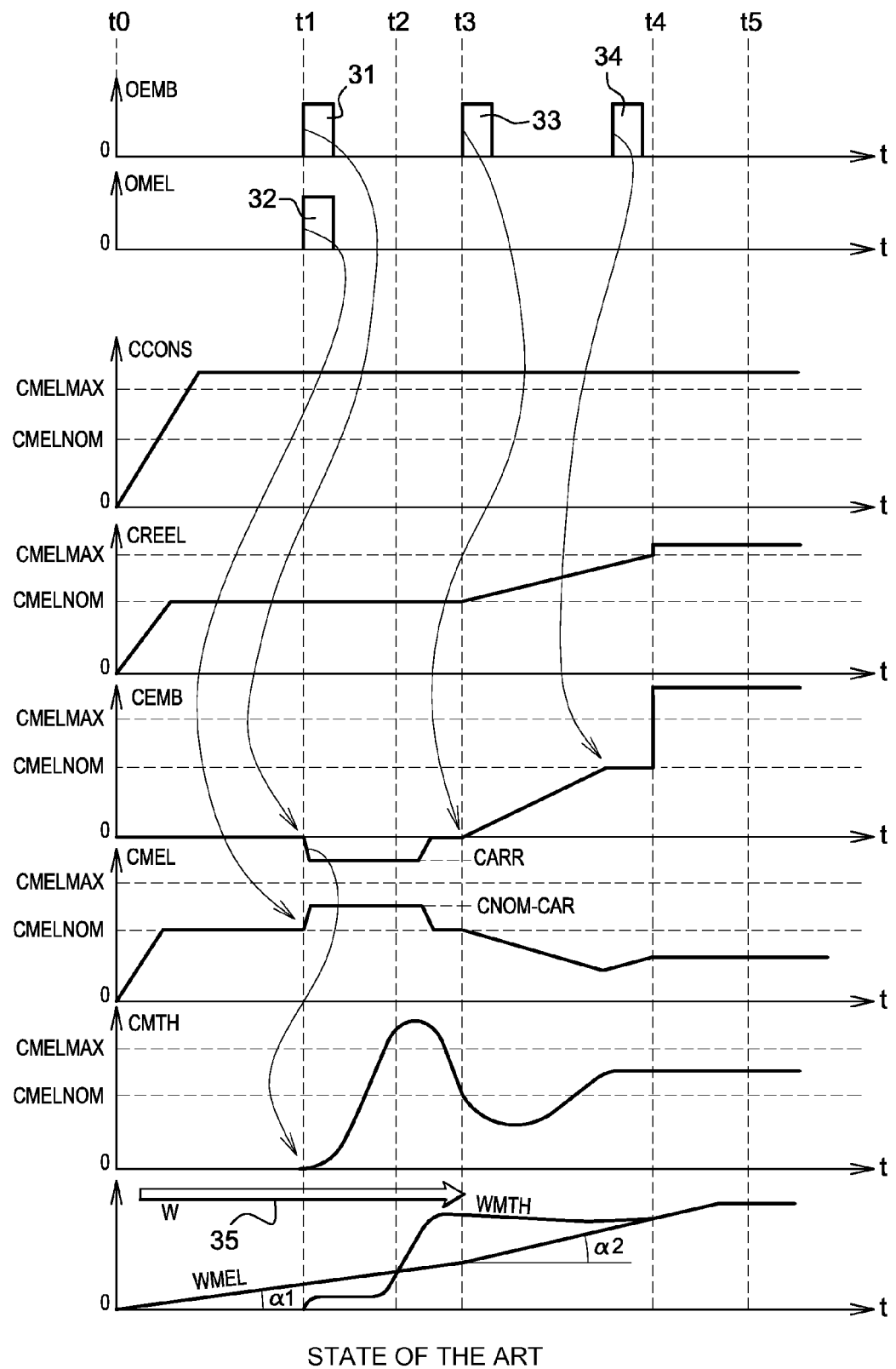

FIG. 2 shows timing diagrams of signals detectable on the various members 2-5 of the state of the art transmission device 1, when the second known method is implemented.

More precisely, FIG. 2 shows the torque signals CEMB, CMEL and CMTH, which correspond to the torques detectable on the clutch 3, the shaft 11 of the electrical machine 4, and the shaft 10 of the heat engine 2, respectively.

FIG. 2 also shows the change over time in torque signals CCONS and CREEL, corresponding respectively to the setpoint torque to apply to the shaft 12 of the wheels 6 and the actual torque detectable on this shaft 12 of the wheels 6. The torque setpoint signal CCONS is established from the MACC signal and the M1-MN signals coming from the sensors.

The OEMB and OMEL signals are sent from the computer 26 to the clutch 3 and the electrical machine 4 to command them. For greater simplicity, the OMTH and OBV signals, which control the heat engine 2 and the speed control unit 5, respectively, are not shown.

Lastly, FIG. 2 shows on a same timing diagram the change over time in the rotation speed WMEL of the electrical machine 4, and the rotation speed WMTH of the heat engine 2.

At instant t0, the vehicle is stopped. The electrical machine 4 and the heat engine 2 each have a zero rotation speed. At instant t0, for example, when the driver pushes on the acceleration pedal 29 by an angle greater than a threshold angle, or when an angular variation of the pedal is above a threshold value, the computer 26 receives a MACC signal corresponding to a request for "performance" initiation of movement.

Between instants t0 and t1, the transmission device 1 enters a first acceleration phase. In this first phase, only the electrical machine 4 powers the drive of the vehicle. More precisely, in this first phase, the setpoint torque CCONS increases exponentially, in correspondence in particular with an acceleration request from the driver. This setpoint torque CCONS increases to the point where at instant t1, it has already reached the peak torque CMELMAX of the electrical machine 4. Moreover, between instants t0 and t1, the electrical machine 4 has a torque CMEL that increases to level off at the nominal torque CMELNOM of this electrical machine 4. The rotation speed WMEL of the electrical machine 4 increases linearly, but it is not sufficient to start the heat engine 2. The heat engine 2 is off and its shaft 10 is not coupled with the shaft 11 of the electrical machine 4. The heat engine 2 thus has both a zero torque CMTH and a zero rotation speed WMTH. Since the engine is off, the torque CREEL measured on the shaft 12 of the wheels 6 is equal to the torque CMEL of the electrical machine 4. The torque CREEL measured on the shaft 12 is thus lower than the expected setpoint torque CCONS. There is no torque detectable on the clutch 3.

Between instants t1 and t2, the transmission device 1 enters a second acceleration phase. In this second phase, as in the first phase, only the electrical machine 4 powers the drive of the vehicle. An objective of this second phase is to start the heat engine 2. More precisely, in this second phase, the setpoint torque CCONS is always greater than the peak torque CMELMAX of the electrical machine 4. At instant t1, the machine 4 has a rotation speed WMEL sufficient to set the heat engine 2 in rotation at a speed enabling it to start. A first signal 31 is then sent from the supervising computer 26 to the clutch 3. This signal 31 commands this clutch 3 in such a way that this clutch 3 transmits a breakaway torque CARR to the heat engine 2 to set it in rotation. This breakaway torque CARR is taken away from the traction drive. Because of this, a second signal 32 is sent by the computer 26 at the same time as the signal 31, to the electrical machine 4. This signal 32 commands the electrical machine 4 so that its torque CMEL offsets the breakaway torque CARR taken by the clutch 3. So in this first transitional phase, the clutch torque signal CEMB decreases and reaches a negative value equal to the breakaway torque value CARR. During this time, the electrical machine 4 torque signal CMEL increases by a value—CARR that is the negative of the breakaway torque value CARR. A heat engine 2 torque signal CMTH is then detectable, corresponding to the starting torque of this heat engine 2. The heat engine 2 then has a rotation speed WMTH that is increasing, but remains lower than the rotation speed WMEL of the electrical machine 4. The heat engine 2 is still not transmitting its torque to the shaft 12 of wheels 6, since it is not coupled with the shaft 11 of the electrical machine 4. The torque CREEL measured on the shaft 12 is therefore still lower than the setpoint torque CCONS expected on this shaft 12. A purpose of the first transitional phase is to run the heat engine 2 through its first compression strokes. After having completed its first rotations, the heat engine 2 is operating at a high enough speed WMTH to be autonomous.

Between instants t2 and t3, the transmission device 1 enters a third acceleration phase. In this third phase, the speed of the heat engine 2 increases, in such a way that the clutch 3 can reopen. More precisely, in this third phase, the setpoint torque CCONS is always greater than CMELMAX. The electrical machine 4 torque signal CMEL decreases from a value CNOM-CARR to the nominal torque value CMELNOM of the electrical machine 4. And the clutch 3 torque signal CEMB returns to zero. The breakaway torque transmission phase thus ends between t2 and t3. Since the shaft 10 of the heat engine 2 is still not coupled with the shaft 11 of the electrical machine 4, the torque CREEL is still equal to the torque CMEL of the electrical machine 4 and remains lower than the setpoint torque CCONS. The rotation speed WMEL of the shaft 11 of the electrical machine 4 increases linearly. The rotation speed WMTH of the shaft 10 of the heat engine 2 increases until it reaches the rotation speed WMEL of the electrical machine 4 at instant t3.

Between instants t3 and t4, the transmission device 1 enters a fourth acceleration phase. In this fourth phase, first the heat engine 2 comes into synchronization, then the clutch 3 is engaged. More precisely, first, a signal 33 is sent by the supervising computer 26 to the clutch 3. This signal 33 commands the clutch plates 8 and 9 to begin sliding relative to one another. The heat engine 2 then transmits a part of its torque CMTH to the shaft 12 of the wheels 6 via the clutch 3. The torque signal CEMB detectable on the clutch 3 then increases with a calibratable profile, such as linearly. The torque signal CMEL of the electrical machine 4 decreases in a roughly symmetrical manner with respect to the clutch 3 torque signal CEMB. In the variant shown with interrupted lines, the electrical machine 3 is maintained full torque, at torque CMELNOM, so that the vehicle operates with a maximal power during the initiation of movement. The torque CREEL increases since the heat engine 2 is beginning to transmit part of its torque to the shaft 11. Further, during the synchronization of the heat engine 2, the rotation speed WMTH of the heat engine 2 converges toward that WMEL of the electrical machine 4. When these two speeds are sufficiently close, a signal 34 is sent to the clutch 3 by the supervising computer 26. This signal 34 commands the closing of this clutch 3. The rotation speeds of the engine WMTH and the machine WMEL then become identical.

Between instants t4 and t5, the transmission device 5 enters its fifth acceleration phase. In this fifth phase, the driving members 2 and 4 converge toward their optimal setpoint torque signals, if they have not yet reached them. More precisely, the setpoint torque CCONS is always higher than the torque CMELMAX. The clutch torque CEMB increases and then passes above the torque setpoint value of the heat engine 2.

This second method has the benefit of a better response time, as compared to the first method. However, this second method remains slow, because it has two acceleration phases. During the first phase, which takes place between t0 and t3, only the electrical machine 4 powers the drive fo the vehicle. Thus, between t0 and t3, the graphic representation of the rotation speed WMEL of the electrical machine increases linearly and forms an angle α1 with the abscissa axis. During the second phase, which takes place between t3 and t5, the drive of the vehicle is powered either by the electrical machine 4 and the clutch 3, when this clutch 3 is sliding, or by the electrical machine 4 and the heat engine 2, when the clutch 3 is engaged. Thus, from the instant t3 when the clutch 3 is made to start sliding, the graphic representation of the rotation speed WMEL of the electrical machine increases linearly and forms with the abscissa axis an angle α2 larger than the angle α1. These two phases are due to the fact that the heat engine 2 must be driven by the electrical machine 4 with a speed sufficiently high to become autonomous.

The time period for making the heat engine 2 available, which corresponds to the time between instant t0 where a "performance" initiation of movement is requested and instant t3 where the heat engine 2 begins to transmit part of its torque, is thus relatively long. This availability delay is shown by the arrow 35 on the speed timing diagram.

Further, during the "performance" initiation of movement, there are great difficulties in implementing the management of the control of the clutch 3 and the electrical machine 4. These difficulties are due essentially to the high sensitivity and the unreliability of the responses of the members 2-5. That is, from one temperature to another, these members 2-5 do not have the same response times. Further, from one temperature to another, torques detectable on shafts associated with these members 2-5 vary.

It is thus difficult to make the withdrawal of the breakaway torque CARR on the clutch 3 and the application of the compensation torque CNAM-CARR by the electrical machine 4 coincide perfectly in time. This synchronization in the withdrawal of the torques is necessary to ensure that there will be no torque interruption when the heat engine 2 is started.

It is also difficult to apply a compensation torque exactly equal to the torque withdrawn by the clutch 3. Indeed, it is difficult to estimate the torque to be applied to the clutch 3 during the transmission of the breakaway torque CARR depending on the temperature of the heat engine 2.

Furthermore, between instants t1 and t4, the electrical machine 4 cannot supply its peak torque CMELMAX in order to achieve the setpoint torque CCONS. The electrical machine 4 cannot operate at its peak torque because it must have a reserve torque that allows it to offset the breakaway torque CARR withdrawn by the clutch 3, regardless of the regime of the vehicle. In other words, the electrical machine 4 must always operate with its nominal torque CMELNOM as the maximum in order to be able to increase to a higher torque at any time to allow it to offset the breakaway torque CARR.

However, this reserve torque is not always available. This reserve torque is only available when the electrical machine 4 operates at a speed WMEL lower than its base speed. For electrical machine 4 speeds greater than the base speed, the starting of the heat engine 2 can thus result in a withdrawal of torque from the wheel 6. This torque withdrawal produces a failure to match the actual acceleration of the vehicle to the acceleration requested by the driver. In one example, the value of the base speed is 2000 RPMs.

The invention thus proposes in particular to solve these problems of delay in making the heat engine 2 available and in synchronizing the actions by the clutch and the electrical machine during the transmission of the breakaway torque. The invention proposes in addition to make the engine start without ever withdrawing torque from the wheels.

To this end, in the invention, the known architecture of the transmission device is supplemented with a starting system that is independent of the electrical machine. That is, this independent starting system drives the heat engine independently of the electrical machine. In the invention, it is no longer the clutch, but the starting system that sends the heat engine its breakaway torque in order to make it start. In this way, this starting system makes it possible to disassociate the problems of starting the engine from those of the vehicle traction drive.

According to the invention, in order to implement "performance" initiations of movement, the heat engine is started at the same time as the initiation of movement of the vehicle by the electrical machine. In other words, the heat engine is started using the starting system, at the same time as the powering on of the electrical machine. The expression "at the same time" covers the case where the engine is started simultaneously with the powering on of the electrical machine and the case where the heat engine is started a few milliseconds after the powering on of the electrical machine. Thus, as soon as a request for "performance" initiation of movement has been made, the torque available on the shaft of wheels is equal to the maximum torque of the electrical machine. Even though the vehicle is stopped, an acceleration of the vehicle can thus be obtained very quickly.

In addition, the introduction of the starting system brings about a simplification of the control of the clutch and of the electrical machine during a "performance" initiation of movement. The new architecture makes it thus possible to avoid the synchronization between the actions of the clutch and of the electrical machine. Further, the "sticking" of the clutch is less critical because the torque passing through the clutch is no longer detectable. In this new architecture, the problem of estimating the torque applied by the electrical machine to compensate the breakaway torque has disappeared, since the clutch does no longer participate in starting the engine.

This starting system also enables a better exploitation of the characteristics of the clutch and of the machine. Thus, it is no longer necessary that the electrical machine have a reserve torque to compensate the breakaway torque withdrawn by the clutch. That is, in the invention, it is the starting system that transmits to the heat engine its startup torque. During a "performance" initiation of movement, the electrical machine can thus operate at its maximum torque to power the drive of the vehicle, during the time when the heat engine is not available. In general, the electrical machine operates at its peak torque as long as the clutch remains disengaged. And when the clutch is engaged, the electrical machine is operated, either at its peak torque, or at a lower torque if a setpoint torque can be complied with.

Thus, the invention concerns a method for fast setting in motion of a vehicle, this method implementing a power transmission device having an electrical machine connected firstly to a heat engine via a clutch and secondly to a wheel shaft, in which, to make the vehicle accelerate quickly when it is stopped,
the electrical machine is powered on, and
the heat engine is started by transmitting to it a breakaway torque,
characterized in that:
the heat engine is started at the same time as the electrical machine is powered on, using a starting system mechanically independent from this electrical machine.

Figure 3:
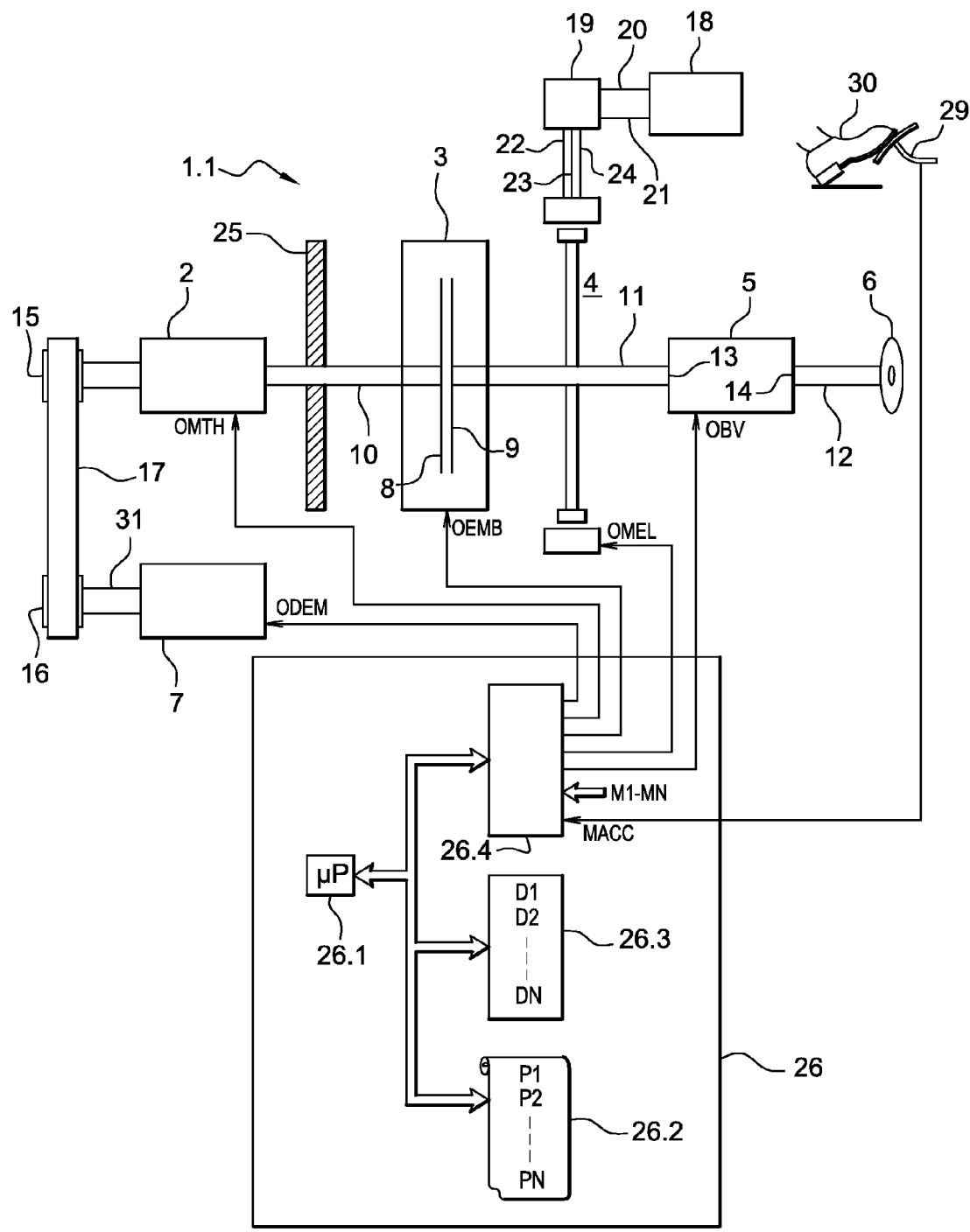
Figure 4:
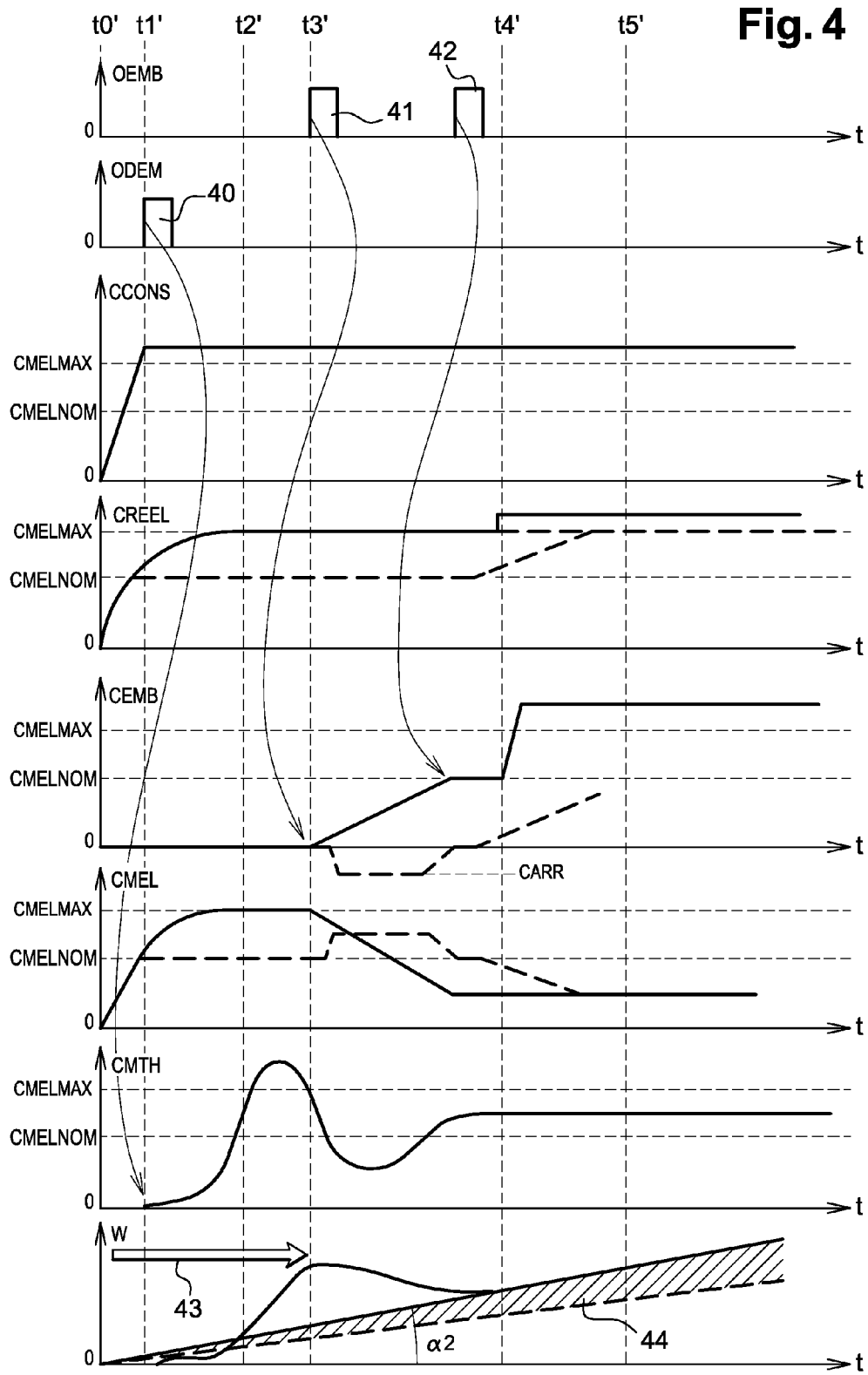

The following description and accompanying Figures will make the invention more easily understood. These Figures are given as an illustration, and are in no way an exhaustive representation of the invention. These Figures show:

FIG. 1 (already described): a schematic representation of a state of the art power transmission device;

FIG. 2 (already described): timing diagrams representing the change over time in signals detectable on members of a state of the art transmission device during a "performance" initiation of movement;

FIG. 3: a schematic representation of a transmission device according to the invention having a starting system;

FIG. 4: timing diagrams representing the change over time in signals detectable on members of a transmission device according to the invention during a "performance" initiation of movement.

FIG. 3 shows a schematic representation of a transmission device 1.1 according to the invention. Like the state of the art transmission device 1, this transmission device 1.1 has a heat engine 2, a clutch 3, an electrical machine 4, a speed control unit 5 and wheels 6. The four members 2-5 and the wheels 6 of the vehicle make up a traction drive, and are arranged in the same manner as in the state of the art transmission device 1. In addition, in accordance with the invention, the transmission device 1.1 has a starting system 7 connected to the heat engine 2.

This starting system 7 is connected to the heat engine 2 and sets it in rotation in order to start it. The starting system 7 is mechanically independent of the electrical machine 4. The starting system 7 thus starts the heat engine 2 without taking power from this traction drive. Consequently, starting the heat engine 2 has less impact on the continuity of the torque applied to the shaft 12 of wheels 6.

The starting system 7 therefore never contributes power to the drive.

For this reason it is appropriately sized to generate just enough power to start the heat engine 2, which is significantly less power than that of the electrical machine 4, and which does not require a high input voltage.

In a particular embodiment, the heat engine 2 has a first pulley 15 attached to one end of its shaft 10. And the starting system 7 has a second pulley 16 attached to one end of its shaft 31. A belt 17 runs through a groove in each of these two pulleys 15 and 16 so as to connect the starting system 7 to the heat engine 2.

In the invention, the electrical machine 4 is always connected to a storage device 18, such as a battery. As a variant, the storage system 18 is an inertia machine or a supercondenser.

In a particular embodiment, the transmission device 1.1 can also have a flywheel 25. This flywheel 25 is connected to the shaft 10 of the heat engine 2, between this heat engine 2 and the clutch 3.

In addition, the transmission device 1.1 according to the invention also has the supervising computer 26. When one of the programs P1-PN is executed, the microprocessor 26.1 commands the interface 26.4 so that in addition to the signals OMTH, OEMB, OMEL, OBV, a signal ODEM is sent to the starting system 7 to control it. The signals OMTH and OMEL control the heat engine 2 and the electrical machine 4, respectively, so that this heat engine 2 always operates at its optimal operating point, where, for a given power level, it consumes a minimum of fuel.

When a change in operating mode occurs, some of the programs P1-PN generate signals OMTH, OEMB, OMEL, OBV and ODEM making it possible to change from one mode to another.

The starting system 7 also has an internal control system that is not shown. This control system makes it possible to regulate the value of the breakaway torque that this starting system 7 must apply to the shaft 10 of the heat engine 2.

In the invention, the clutch 3 is a wet or dry plate clutch. As a variant, the clutch 3 has more than two plates.

FIG. 4 shows in particular timing diagrams of signals detectable on the various members 2-5 of the transmission device 1.1 according to the invention. As in FIG. 2, these signals are detected during a "performance" initiation of movement. The signals associated with the state of the art transmission device 1 are shown as dashed lines so they can be compared with the signals associated with the transmission device 1.1 according to the invention, shown as solid lines.

For increased simplicity, only the signals OEMB and ODEM which play a major role during this "performance" initiation of movement have been shown.

At instant t0', as before, the vehicle is stopped. Thus, the electrical machine 4 and the heat engine 2 each have a zero rotation speed. At instant t0', when, for example, the driver pushes the acceleration pedal 29 by an angle greater than a threshold angle, the computer 26 receives a signal MACC corresponding to a request for performance initiation of movement.

Between the instants t0' and t1', the transmission device 1.1 enters a first acceleration phase. In this first phase, only the electrical machine 4 powers the drive of the vehicle. More precisely, during this first phase, the setpoint torque CCONS increase such that, at instant t1', it is already higher than the nominal torque CMELNOM of the electrical machine 4. Further, the torque signal CMEL of the electrical machine 4 increases and follows the appearance of the torque signal CCONS. The heat engine 2 is stopped and its shaft 10 is not coupled to the shaft 11 of the electrical machine 4. The heat engine 2 thus has a torque CMTH of zero. The torque signal CREEL measurable on the shaft 12 of wheels 6 thus follows the appearance of the setpoint torque signal CCONS. In addition, the rotation speed of the heat engine 2 is zero while the rotation speed WMEL of the electrical machine 4 increase linearly. This first phase is much shorter than the first acceleration phase of the state of the art method. That is, using the starting system 7, it is no longer necessary to wait until the electrical machine 4 has reached a sufficient speed to start the heat engine 2. In a particular embodiment, this first phase lasts until the time a decision to start the heat engine has been taken: 0 ms in theory, between 20 and 40 ms in practice.

Between instants t1' and t2', the transmission device 1.1 enters a second acceleration phase. An objective of this second phase is to start the heat engine 2. To this effect, at instant t1', at the end of the execution of the programs P1-PN by the computer 26, a signal 40 is sent to the starting system 7. This signal 40 commands the starting system 7 which drives the heat engine 2 in rotation. A torque signal CMTH corresponding to the starting torque of this heat engine 2 is then detectable. The shaft 10 of the heat engine 2 is still not coupled with the shaft 11 of the electrical machine 4, so that the latter alone still powers the drive of the vehicle. Further, the setpoint torque CCONS is still higher than the peak torque CMELMAX of the electrical machine 4. The torque CMEL of the electrical machine 4 increases, so as to provide a torque to the wheel shaft 12 higher than that which would have been detectable without the starting system 7. That is, contrary to the electrical machine 4 of the device 1, the electrical machine 4 is capable of operating at its peak torque CMELMAX when the heat engine 2 is not available, i.e., as long as it does not provide any torque to the wheels 6. The reserve torque is no longer necessary, since the electrical machine 4 does not intervene directly any longer in the starting of the heat engine 2. The heat engine 2 then has a rotation speed WMTH which is lower than that of the electrical machine 4. As in the second acceleration phase of the method according to the state of the art, the heat engine 2 runs through its first compressions so as to reach a speed sufficient to be autonomous. In general, as soon as the heat engine 2 is autonomous, the computer 26 sends a signal to the starting system 7, so as to cut off this starting system 7, i.e., to stop it.

Between instants t2' and t3', the transmission device 1.1 enters a third acceleration phase. In this third phase, the electrical machine still operates at its peak torque CMELMAX. As a variant, if the request by the driver is lower, i.e., the setpoint torque CCONS is lower than CMELMAX, the machine 4 follows this torque CCONS. Since the shaft 11 of the machine 4 and the shaft 10 of the engine 2 are not coupled, the torque signal CREEL follows the torque signal CMEL. The rotation speed WMTH of this heat engine 2 increases so that at instant t3' it is higher than the rotation speed WMEL of the electrical machine 4. The rotation speed WMEL of the electrical machine 4 still increases linearly. No torque CEMB is detectable on the clutch 3. An objective of this third phase is to increase the rotation speed of the heat engine 2 to make it possible, as will be seen below, to make the plates 8 and 9 of the clutch 3 start sliding with respect to one another.

Between instants t3' and t4', the transmission device 1.1 enters a fourth acceleration phase. In this fourth phase, first, a synchronization of the heat engine 2 takes place, then the clutch 3 is engaged. More precisely, first, at instant t3', a signal 41 is sent to the clutch 3. This signal 41, like before the signal 33, commands the plates 8 and 9 to start sliding with respect to one another. The heat engine 2 then transmits a portion of its torque CMTH to the shaft 12 of the wheels 6 via the clutch 3. The torque detectable on the clutch 3 thus increases in a calibratable manner, such as, for example, linearly, since this clutch 3 transmits a torque to the power drive. The torque signal CMEL of the electrical machine 4 can then decrease symmetrically with respect to the torque CEMB of the clutch, if the setpoint torque CCONS is complied with. In the case where the setpoint torque CCONS would not be complied with, the torque signal CMEL can remain at its maximum CMELMAX.

More generally, during a "performance" initiation of movement, the electrical machine is controlled, either so as to provide its maximum torque to give the vehicle a maximum power, or so as to provide only part of its torque if the setpoint torque CCONS can be complied with. By operating the electrical machine 4 at a torque lower than its peak torque when CCONS can be complied with, electrical power from the battery is saved. During the synchronization of the heat engine 2, the rotation speed WMTH of the heat engine 2 converges toward that WMEL of the electrical machine 4. When these two speeds are substantially equal, a signal 42 is sent to the clutch 3 to command it to engage. The rotation speeds of the heat engine WMTH and of the electrical machine WMEL thus become identical. In practice, the signal 42 is sent when the absolute value of the difference between the rotation speed WMTH of the heat engine 2 and the rotation speed WMEL of the electrical machine 4 is lower than a value comprised between 0 and 15% of the rotation speed WMEL of the machine 4.

With a state of the art method, between t3' and t4', it is possible that the heat engine 2 has just begun to be started by the clutch 3 whose torque signal is shown in dashed lines. On the contrary, in the method according to the invention, the synchronization phase has already begun.

Between instants t4' and t5', the transmission device 1.1 enters a fifth acceleration phase. In this fifth phase, the setpoint torque signal CCONS is always higher than the torque CMELMAX. As a variant, the torque CCONS increases, in a calibratable manner, for example, stepwise. As before, in this fifth phase, the torques CMTH and CMEL of the power members 2 and 4 converge toward their optimal setpoint value with respect to the consumption of the heat engine 2, if they have not yet reached it. The torque detectable on the clutch 3 engages so as to become higher than the torque of the heat engine 2. The rotation speeds WMTH and WMEL of the heat engine 2 and of the electrical machine 4 increase with the speed of the vehicle.

Thus, when the heat engine 2 is started, the clutch 3 is disengaged and remains disengaged during a predetermined time period which lasts between t0' and t3'. This time period can be a function of the setpoint torque CCONS requested by the driver and/or of the time needed by the heat engine 2 to become autonomous. As a variant, the clutch 3 is already engaged when the heat engine 2 is started. In this variant, the starting system 7 and the electrical machine 4 both contribute to the transmission of the breakaway torque CARR to the heat engine 2. In an example, the starting system 7 is connected to the heat engine 2 via a first reducer assembly that has a lower ratio than that of a second reducer assembly, through which the electrical machine 4 and the heat engine 2 are connected, so that the torque applied to the shaft 10 of the heat engine 2 by the starting system 7 is higher than the torque applied to this shaft 10 by the electrical machine 4.

As a variant, startup of the heat engine 2 is commanded as soon as instant t0. That is, in this variant, the signal 40 is sent as soon as instant t0'.

The time for making the heat engine 2 available corresponds here to the time period between instant t0' when a "performance" initiation of movement is requested and instant t3' when the heat engine 2 begins to transmit a portion of its torque. As has been seen, the first acceleration phase in particular of the method according to the invention is much shorter than the first acceleration phase of the state of the art method. The delay for making the heat engine 2 available in the method according to the invention is thus shorter than the delay for making this engine available in the state of the art method. The delay for making the heat engine available in the method according of the invention is shown by an arrow 43 which is shorter than the arrow 35.

In addition, the graphical representation of the rotation speed WMEL of the electrical machine 4 always forms an angle α2 with the abscissa axis. Between instants t0 and t5, the electrical machine 4 thus has a rotation speed WMEL always higher than that which it had when it was used with the state of the art transmission device 1. To this effect, in the invention, the drive of the vehicle is very quickly powered by the heat engine 2 and the electrical machine 4. The method according to the invention thus makes it possible to increase the acceleration during the performance initiation of movement, as compared to the state of the art method. This acceleration increase is shown on the speed timing diagram by a shaded area 44.

Further, in the invention, during the delay until the heat engine 2 is made available, the electrical machine is capable of operating at its maximum torque. In contrast, with a state of the art method, the electrical machine 4 had to operate at its nominal torque at most so as to be able to compensate the breakaway torque CARR at any time. As a consequence, during the whole duration of the "performance" initiation of movement, the torque CREEL measured with the method of the invention is higher than the torque CREEL measured with the state of the art method.

In addition, in the invention, during the transmission of the breakaway torque CARR by the starting system 7, actions applied to the clutch 3 by the heat engine 2 and by the electrical machine 4 are performed independently from one another. An action by the electrical machine 4 is to set the vehicle in motion. An action by the engine 2 is an action by the starting system 7 which is to start the heat engine 2. That is, since the starting system 7 is independent, it is no longer necessary to synchronize these actions.

With the method according to the invention, startup of the heat engine 2 is more robust than with a state of the art method. That is, the heat engine 2 is started with a constant torque, regardless of the driving conditions of the vehicle. In addition, initiation of the engine rotation is done independently from the wheels 6. Thus, the risk that the driver would feel something is much lower. That is, there is a high risk of uncomfortable feelings with the known method of engine starting via the clutch 3 because it is difficult to estimate the breakaway torques thus passing through the clutch 3.

Thanks to the invention, during a performance initiation of movement, the response time is lowered, while the acceleration of the vehicle and the comfort during startup of the heat engine 2 are increased.

The invention claimed is:

1. Method for fast setting in motion of a vehicle, this method utilizing a power transmission device having an electrical machine connected firstly to a heat engine via a clutch and secondly to a shaft of wheels, in which, to make the vehicle accelerate quickly when it is stopped, wherein the method comprises:

powering on the electrical machine, and starting the heat engine by transmitting to it a breakaway torque (CARR), at the same time as the electrical machine is powered on, using a starting system connected to the heat engine and mechanically independent of the electrical machine, and once the heat engine has been started, allowing the heat engine to run through its first compressions so that it is autonomous, then cutting off the starting system, and in a time period from a time when the clutch starts transmitting torque to a time period when the clutch becomes fully closed, making the torque (CMTH) of the heat engine and the torque (CMEL) of the electrical machine converge toward respective optimal setpoint values with respect to fuel consumption of the heat engine.

2. Method according to claim 1, further comprising:
during startup of the heat engine, releasing the clutch and leaving the clutch disengaged during a predetermined time.

3. Method according to claim 2, further comprising:
operating the electrical machine at its peak torque (CMELMAX) as long as the clutch remains disengaged.

4. Method according to claim 2, further comprising:
after the heat engine has been started and the electrical machine has been powered on, increasing a rotation speed (WMTH) of the heat engine until the rotation speed of the heat engine becomes greater than a rotation speed (WMEL) of the electrical machine.

5. Method according to claim 2, further comprising:
after the heat engine has been started and the electrical machine has been powered on, making plates of the clutch slide with respect to one another, one of the plates of this clutch being connected to a shaft of the heat engine, another plate of this clutch being connected to a shaft of the electrical machine.

6. Method according to claim 5, further comprising:
making a rotation speed (WMTH) of the heat engine converge toward a rotation speed (WMEL) of the electrical machine, and
engaging the clutch when the rotation speed (WMTH) of the heat engine is substantially equal to the rotation speed (WMEL) of the electrical machine.

7. Method according to claim 1, further comprising:
when the clutch is engaged, operating the electrical machine either (i) at its peak torque (CMELMAX) or (ii) at a lower torque tending to comply with a setpoint torque (CCONS).

8. Method according to claim 1, comprising:
initiating the method when an acceleration pedal is pushed by an angle higher than a threshold angle, or when an angular variation of this pedal is higher than a threshold value.

9. Method according to claim 1, wherein:
at the beginning of the method, the rotation speed (WMTH) of the heat engine and the rotation speed (WEL) of the electrical machine are zero.

* * * * *